(12) United States Patent
Yamamoto et al.

(10) Patent No.: US 8,828,178 B2
(45) Date of Patent: Sep. 9, 2014

(54) SEALING DEVICE

(75) Inventors: Hironori Yamamoto, Okayama (JP); Koki Ishida, Okayama (JP); Tatsuo Katayama, Okayama (JP); Tadashi Kasamoto, Okayama (JP); Yoshihiko Yamaguchi, Okayama (JP); Chihiro Asanuma, Okayama (JP)

(73) Assignee: Uchiyama Manufacturing Corp., Enami, Naka-ku, Okayama-shi, Okayama (JP)

( * ) Notice: Subject to any disclaimer, the term of this patent is extended or adjusted under 35 U.S.C. 154(b) by 0 days.

(21) Appl. No.: 13/417,530

(22) Filed: Mar. 12, 2012

(65) Prior Publication Data

US 2012/0223484 A1   Sep. 6, 2012

Related U.S. Application Data

(62) Division of application No. 12/585,806, filed on Sep. 25, 2009, now abandoned.

(30) Foreign Application Priority Data

Oct. 1, 2008   (JP) ................... 2008-256506
Aug. 7, 2009   (JP) ................... 2009-184900

(51) Int. Cl.

| | | |
|---|---|---|
| B29C 65/00 | (2006.01) |
| B32B 37/00 | (2006.01) |
| B32B 38/00 | (2006.01) |
| B31B 1/60 | (2006.01) |
| F16C 32/00 | (2006.01) |
| F16C 41/04 | (2006.01) |
| F16C 33/76 | (2006.01) |
| F01B 25/00 | (2006.01) |
| F03B 15/00 | (2006.01) |
| F04D 15/00 | (2006.01) |
| F04D 27/00 | (2006.01) |
| F16J 15/34 | (2006.01) |
| F16J 15/32 | (2006.01) |
| H03M 1/22 | (2006.01) |
| G01P 3/48 | (2006.01) |
| G01P 3/54 | (2006.01) |
| F16C 41/00 | (2006.01) |
| F16C 33/78 | (2006.01) |
| F16C 19/18 | (2006.01) |

(52) U.S. Cl.
CPC ............ *F16C 41/007* (2013.01); *F16C 19/186* (2013.01); *F16C 2326/02* (2013.01); *F16C 33/7883* (2013.01)
USPC ........... 156/281; 384/448; 384/484; 384/478; 324/174; 277/399; 277/549; 277/562; 277/571; 277/572; 156/60

(58) Field of Classification Search
CPC ............ B67B 3/00; B67B 3/12; B67B 3/14; B29C 65/00; B29C 65/002; B29C 65/02; B29C 65/18; B29C 65/48; B29C 65/70; B29C 65/4805; B29C 65/481; B29C 65/4815; B29C 65/4825; B29C 66/0346; B32B 37/00; B32B 37/12; B32B 37/1207; B32B 37/22; B32B 37/223; B32B 38/0012; B32B 38/10; B32B 2037/12; B32B 2037/1207; B32B 2037/1215; B32B 2037/1253; B32B 2038/0012
USPC ............... 156/60, 281; 384/448, 478; 415/11; 277/399, 549, 562, 571, 572; 341/15; 324/174
See application file for complete search history.

(56) References Cited

U.S. PATENT DOCUMENTS

| | | | |
|---|---|---|---|
| 6,637,754 B1 * | 10/2003 | Ohtsuki et al. ................ 277/549 |
| 6,979,001 B2 | 12/2005 | Ohtsuki et al. |
| 2003/0128899 A1 * | 7/2003 | Dennis ......................... 383/202 |
| 2004/0017301 A1 | 1/2004 | Mizuta |
| 2007/0152657 A1 * | 7/2007 | Yabe et al. .................... 324/174 |

FOREIGN PATENT DOCUMENTS

| | | |
|---|---|---|
| EP | 1830086 A1 | 9/2007 |
| JP | 09-079274 | 3/1997 |
| JP | 11-190351 | 7/1999 |
| JP | 2003-262231 | 9/2003 |
| JP | 2003262231 A * | 9/2003 ............. F16C 33/78 |
| WO | WO 2006064908 A1 | 6/2006 |

* cited by examiner

*Primary Examiner* — Matthew Daniels
*Assistant Examiner* — Matthew Hoover
(74) *Attorney, Agent, or Firm* — Bacon & Thomas, PLLC (57) ABSTRACT

A sealing device which comprises a slinger fixedly fitted to the rotary side member, a core member fixedly fitted to the stationary side member, and an elastic sealing member fixed to the core member and having a seal lip which elastically and slidably contacts the slinger. The slinger comprises a fitting cylindrical portion to be fitted into the rotary side member, a brim portion extending its radial direction at one end of its outside relative to a sealed portion of the fitting cylindrical portion, and a rotary side fixing member fixed to the brim portion. Further, the slinger is made in such a manner that an adhesive layer is formed on its whole surface including a contacting side surface where the seal lip contacts by applying adhesive agent thereon, then the fixing member is integrally fixed thereto, thereafter the adhesive layer is partially removed only in the contacting side surface.

5 Claims, 7 Drawing Sheets

SEALING DEVICE

CROSS REFERENCE TO RELATED APPLICATION

This application is a divisional application of application Ser. No. 12/585,806, now abandoned.

TECHNICAL FIELD

The present invention relates to a sealing device interposed in a portion required to be sealed between a stationary side member and a rotary side member such as a bearing unit in the wheel suspension of automobile, more specifically to a sealing device having a slinger fixedly fitted to a rotary side member, a core member fixedly fitted to a stationary side member, and an elastic sealing member which is fixed to the core member and elastically and slidably contacts the slinger, whereby sealing a space between the rotary side member and the stationary side member.

BACKGROUND ART

A sealing device has been well known which is interposed between a stationary side member and a rotary side member like a bearing unit in the wheel suspension device of automobile in order to prevent water and dust from entering.

Several measures have been recently taken so as to realize fuel efficient vehicles and the reduction of rotary torque is sought for the bearing unit.

In order to reduce the friction force with the sealing member, the slidably contacting surface of the sealing member fixed to the core member with the slinger (referred to slidably contacting surface hereinafter) is executed with surface treatment or other member is interposed between the slidably contacting surface.

The following patent citations 1 (Japanese Patent Publication, H11-190351-A) and 2 (Japanese Patent Publication, 2003-282231-A) disclose that the slidably contacting surface is treated with some surface treatment.

The patent citation 1 describes a sealing member wherein a nitride layer or a nitrosulphurizing layer is formed on the slidably contacting surface in a condition that surface oxide is removed, and accordingly the outer surface can be reformed to have fine, flat and hard surface nature while thermal strain of a base material is restrained during formation of the layer. It describes that, as the result, the frictional coefficient of the sliding part of the sealing member becomes low and heat generation can be restrained even though oil film is consumed.

The patent citation 2 describes a seal for roller bearing wherein the slidably contacting surface is executed with hardening treatment or applied with a hard film having corrosion resistance and a rust-prevention property. It describes that, as the result, anti-abrasive wearing ability and anti-corrosion wearing ability are improved on the slidably contacting surface under the circumstances of dirty salt water, thereby reducing the wearing amount on the metal surface and improving the sealing ability and the sealing durability.

The patent citation 3 (Japanese Patent Publication, H09-79274-A) is an embodiment in which other member is interposed between the sealing member and the slidably contacting surface.

The patent citation 3 describes an oil seal device in which a heat shrinking tube is fitted to the peripheral surface of a rotary side member and a sealing member comes into sliding contact by a fixed margin with a smooth surface of the tube. It describes that, as the result, wearing of the sealing member can be remarkably reduced by utilizing the lubricity of the heat shrinking tube.

DISCLOSURE OF INVENTION

Problems to be Solved in the Invention

A sealing device may have a tone wheel made of a circular multipolar magnet at the outer surface of a slinger or have a seal lip on the slinger side in addition to the core member side. According to such a sealing device, the tone wheel or the seal lip is integrally stuck to the slinger with an adhesive agent and it is preferable that the adhesive agent is applied all over the sticking surface and it is strongly adhered to the slinger.

However, it may be difficult that the adhesive agent is applied to every end of the tone wheel and the seal lip depending on their shape.

Accordingly, the slinger is entirely dipped in the adhesive agent prepared in a vessel and thereafter the tone wheel or a seal lip at slinger side is attached.

In such a case, even if the slidably contacting surface is executed with surface treatment like the patent citations 1 and 2, an adhesive layer is formed on the surface treated slidably contacting surface by the adhesive agent. Therefore, there is a problem that the reduction effect of the rotary torque is deteriorated even if surface treatment is executed.

Further, according to the patent citation 3, the slinger to be fixedly fitted to the rotary side member is not expected, so that such a device cannot be used for a sealing device in which a tone wheel or a seal lip is stuck to the slinger.

The present invention is proposed in view of the above-mentioned problems and it provides a sealing device in which a fixing member to be fixed to the slinger is strongly adhered and the rotary torque can be reduced.

Means to Solve Problems

According to the present invention proposed to achieve the above-mentioned objects, the sealing device has a slinger fixedly fitted to a rotary side member, a core member fixedly fitted to a stationary side member, and an elastic sealing member fixed to the core member and having a seal lip which elastically and slidably contacts the slinger, the sealing device sealing a space between the rotary side member and the stationary side member. The slinger comprises a fitting cylindrical portion to be fitted into the rotary side member, a brim portion extending its radial direction at one end of its outside relative to a sealed portion of the fitting cylindrical portion, and a rotary side fixing member fixed to the brim portion, and the slinger is made in such a manner that an adhesive layer is formed on its whole surface including a contacting side surface where the seal lip contacts by applying adhesive agent thereon, then the fixing member is integrally fixed thereto, thereafter the adhesive layer is partially removed only in the contacting side surface.

According to the sealing device of the present invention, the slinger may be made in such a manner that an adhesive layer is formed on its whole surface including a contacting side surface where the seal lip contacts by applying adhesive agent thereon, then the adhesive layer is partially removed only in the contacting side surface and thereafter the fixing member is integrally fixed thereto.

In the present invention, the adhesive layer may be partially removed only in the contacting side surface by way of laser emission treatment.

In addition, a physical method of removing the adhesive layer includes a shot peening treatment and a shot blast treatment. Further, as a chemical method, an adhesive removal liquid may be used depending on the component of adhesive agent.

Further according to the present invention, the contacting side surface may be formed such that the adhesive layer is removed and surface roughening finishing is treated thereon.

According to the present invention, the slinger may comprise a fitting cylindrical portion to be fitted into the rotary side member, a brim portion extending its radial direction at one end of its outside relative to a sealed portion of the fitting cylindrical portion, and a rotary side fixing member fixed to the brim portion, and the slinger may be made in such a manner that an adhesive layer is formed on its whole surface by applying adhesive agent thereon, then the fixing member is integrally fixed thereto with a part of the adhesive layer, thereafter other member is provided on a surface where the seal lip contacts, thereby constituting a contacting surface relative to the seal lip.

In this case, a surface roughening finishing may be treated on the contacting surface relative to the seal lip. Material of the other member is not limited, however, it includes a metal material, a synthetic resin material like engineering plastic, ceramics, glass, industrial diamond, a resin material with low friction, elastomer and so on.

Advantageous Effects

According to the sealing device of the present invention, after an adhesive agent is applied on the whole surface of the slinger and the fixing member is integrally stuck to the slinger, the adhesive layer formed on the slidably contacting surface of the slinger with the seal lip is removed. Therefore, the adhesive layer is not formed on the slidably contacting surface of the slinger with the seal lip, so that the friction resistance of the seal lip can be reduced, thereby reducing the rotary torque.

Further, even when after the adhesive agent is applied on the whole surface of the slinger and only the adhesive layer formed on the slidably contacting surface of the slinger with the seal lip is removed, the fixing member is integrally stuck to the slinger, the adhesive layer is not formed on the slidably contacting surface with the seal lip. Therefore, the friction resistance of the seal lip can be reduced, thereby achieving reduction of the rotary torque.

Accordingly, when the sealing device of the present invention is used for the bearing unit of vehicle, fuel-efficiency can be achieved. Further, the whole sticking surface of the fixing member is filled with the adhesive agent applied on the whole surface of the slinger, so that the adhesive agent is spread over every end of the fixing member and the fixing member can be firmly adhered to the slinger.

In the present invention, if removal of the adhesive layer on the slidably contacting surface of the slinger with the seal lip is executed by a laser treatment, an uneven surface without having edges can be easily formed, thereby more effectively reducing the friction resistance on the slidably contacting surface.

Further in case of a laser treatment, even if the surface to be treated is formed like a ring and its area is very small, an exact and effective removal treatment can be done at the surface (slidably contacting surface) to be treated. In addition, according to the laser treatment, the degree of treatment can be easily controlled depending on the characteristic of the material of the slinger and the thickness of the adhesive layer.

According to the present invention, when the slidably contacting surface is treated to be roughened in addition to the removal treatment of the adhesive layer on the slidably contacting surface, removal of the adhesive layer and roughening of the slidably contacting surface can be done by one procedure, so that the roughened surface can further reduce the friction resistance of the seal lip, thereby remarkably reducing the rotary torque.

When the other member is interposed between the slidably contacting surface of the slinger with the seal lip to constitute a slidably contacting surface, the seal lip slidably contacts with the other member. Therefore, the adhesive layer is not provided on the slidably contacting surface of the seal lip, so that the friction resistance of the seal lip can be reduced, thereby achieving reduction of the rotary torque. When the sealing device of the present invention is used for the bearing unit of vehicle, fuel-efficiency can be achieved Also in this case, the whole sticking surface of the fixing member is filled with the adhesive agent applied on the whole surface of the slinger, so that every end of the fixing member is applied with the adhesive agent and the fixing member can be firmly adhered to the slinger.

Further, when the slidably contacting surface is treated to be roughened, the friction resistance of the seal lip can be further reduced, thereby remarkably reducing the rotary torque.

BRIEF DESCRIPTION OF DRAWINGS

FIG. 3a to FIG. 3c are diagrammatical sectional views showing one example of the production procedures of the sealing device of the first embodiment.

FIG. 4a to FIG. 4c are diagrammatical sectional views showing the production procedures of the sealing device different from the embodiment in FIG. 3.

BEST MODE FOR CARRYING OUT THE INVENTION

The embodiment of the present invention is explained referring to the drawings.

The first embodiment of the present invention is explained at first referring to FIG. 1 to FIG. 5

Example in which a tone wheel 70 is used as a fixing member to be fixed to the slinger 7 of the sealing device 6 (refer to FIG. 1 to FIG. 4) and an example in which a rotary side seal lip 11 is used (refer to FIG. 5) are explained.

Figure 1:
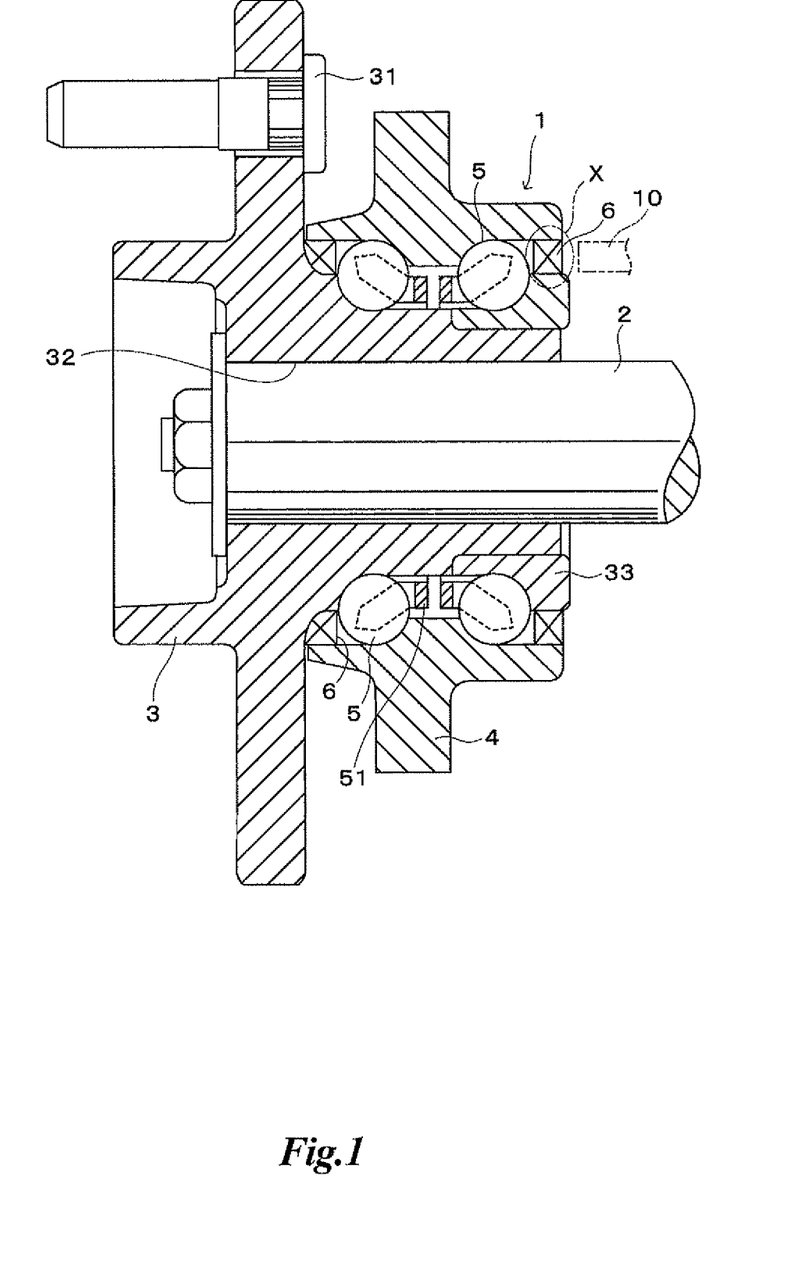
FIG. 1 is a longitudinal sectional view showing the first embodiment in which the sealing device of the present invention is employed for the bearing unit.

FIG. 1 shows one example of the structure which supports vehicle wheels relative to a driving shaft 2 by a bearing unit 1. A tire wheel (not shown) is fixed to a hub 3 constituting an inner ring with a bolt 31. The reference numeral 32 indicates a spline hole formed in the hub 3 and the driving shaft 2 is spline fitted in the spline hole 32 to be integrally fixed to the hub 3, thereby transmitting the rotary drive force of the driving shaft 2 into the tire wheel. The reference numeral 33 indicates an inner ring member and constitutes the inner ring together with the hub 3.

The reference numeral 4 indicates an outer ring and is fixedly fitted to the vehicle suspension (not shown). Two rows of rolling elements (ball) 5 . . . are interposed while being held with a retainer 51 between the outer ring 4 and the inner ring (hub 3 and inner ring member 33). The reference numeral 6 indicates a sealing device for preventing leakage of lubricant agent (grease and the like) provided in the rolling portion of the rolling elements 5 . . . and for preventing ingress of dirt or water from outside and is inserted under pressure between the outer ring 4 and the inner ring (hub 3 and inner ring member 33). The sealing device 6 provided at the vehicle side has a tone wheel 70 made of a circular multipolar magnet. The portion enclosed with the sealing device 6, the inner ring (hub 3 and inner ring member 33) and the outer ring 4 constitutes a sealed portion S.

Figure 2:
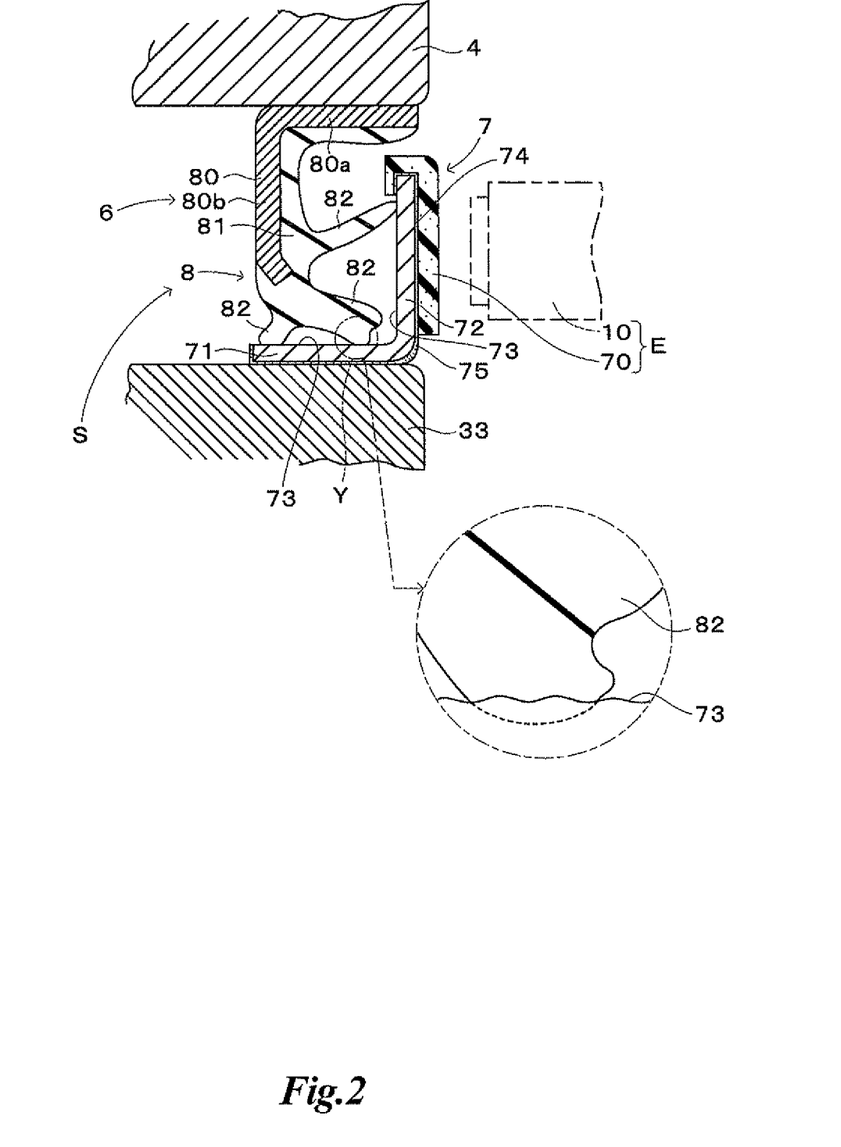
FIG. 2 is an enlarged view of the portion "X" in FIG. 1.

FIG. 2 is an enlarged view of the portion "X" in FIG. 1 in which a ring-like slinger 7 obtained by sheet metal processing of stainless steel (SUS430 and the like) is externally fitted into the peripheral body at the inner ring side (hub 3 and inner ring member 33). The slinger 7 comprises a fitting cylindrical portion 71 fitted to the peripheral body of the inner ring (hub 3 and inner ring member 33) and a brim portion 72 radially extended at an end of the fitting cylindrical portion 71, which is opposite to a sealed portion S.

A ring-like core member 80 obtained by sheet metal processing of stainless steel (SUS430) is externally fitted into the peripheral body (inner peripheral surface) at the outer ring 4 side. The core member 80 comprises a cylindrical portion 80a fixedly fitted to the peripheral body of the outer ring 4 and an inward brim portion 80b connected to an end of the cylindrical portion 80a. And the core member 80 is fixed with a sealing member 8 made of a rubber material selected from NBR, H-NBR, ACM, AEM, FKM and the like. The sealing member 8 comprises a lip body 81 made of an elastic material such as rubber integrally formed with the core member 80 and the lip body 81 includes a plurality of seal lips 82 . . . extending like a tongue. When the slinger 7 and the core member 80 with the sealing member 8 are fitted and combined each other to constitute the sealing device 6, the tip ends of the seal lips 82 . . . elastically and slidably contact the surface of the slinger 7 accompanied with elastic deformation. The reference numeral 73 in the figure shows a slidably contacting surface of the slinger 7 with the seal lip 82.

The tone wheel 70 which is made of a circular multipolar magnet on which a plurality of N poles and S poles are alternately provided along the circumferential direction to be magnetized is integrally stuck on the outer surface 74 (at vehicle side) of the brim portion 72 of the slinger 7 relative to the sealed portion S.

A magnetic sensor 10 is fixedly provided for the outer ring 4 or the stationary side member of the vehicle and constitutes a magnetic encoder E together with the tone wheel 70 for detecting the rotary speed of the tire wheel. The tone wheel 70 is made of a magnetic rubber sheet in which magnetic powder such as ferrite or rare earth is mixed in advance with a rubber material selected from NBR, H-NBR, ACM, AEM, FKM and the like and is magnetized by arranging a plurality of N poles and S poles alternately in the circumferential direction. The tone wheel 9 may not be limited to be made of the above magnetic rubber, but may be a plastic magnet or a sintered magnet.

The tone wheel 70 is integrally fixed to the outer surface 74 of the brim portion 72 of the slinger 7 with adhesive. The reference numeral 75 in the figure indicates an adhesive layer formed with an adhesive agent. The adhesive agent is preferably an epoxy-based adhesive or a phenolic adhesive, however, it may be an elastic adhesive such as sealant or elastomeric adhesive.

Thus the sealing device 6 having the tone wheel 70 is constituted with the slinger 7, the core member 80, the sealing member 8 and the tone wheel 70. The slidably contacting surface 73 of the slinger 7 to which the seal lips 82 . . . elastically contact becomes a sealing surface on which they slidably contact each other accompanied with rotation of the inner ring (hub 3 and inner ring member 33), thereby preventing invasion of dirt or water into the bearing unit 1 from outside and leakage of grease and the like filled in the bearing unit 1. In the figure, three seal lips 82 which slidably contact the fitting cylindrical portion 71 and the brim portion 72 of the slinger 7 are formed, however, the shape of seal lip 82 is not limited to the embodiment in the figure. The slidably contacting surface 73 may be applied with grease of ester, synthetic hydrocarbon or mineral oil.

The enlarged view of the portion "Y" in FIG. 2 diagrammatically shows how the slidably contacting surface 73 is formed.

The slidably contacting surface 73 of the slinger 7 with the seal lip 82 as shown in the enlarged view of "Y" portion is processed with roughening treatment in addition to removal of the adhesive layer 75 for adhering the tone wheel 70.

Because the adhesive layer 75 is removed, the slidably contacting surface 73 of the slinger 7 with the seal lip 82 is not provided with the adhesive layer 75, so that the friction resistance of the seal lip 82 can be reduced and the rotary torque can be also reduced.

When grease is applied on the slidably contacting surface 73 with roughening treatment, it can be kept thereon for a long time, thereby more effectively improving the sealing ability and reducing the friction resistance.

In addition, it is made uneven surface without edges as shown in the enlarged view of the portion "Y" in FIG. 2, the friction resistance of the slidably contacting surface 73 can be more effectively reduced.

A method for removing the adhesive layer 75 or a method for removing the adhesive layer 75 and for executing roughening treatment includes a laser treatment, a shot peening treatment, a shot blast treatment, and the like.

Here a laser treatment and a shot peening treatment are detailed.

(Laser Treatment)

The following conditions are employed for a laser treatment for removing the adhesive layer 75.

The kinds of laser to be used are not specifically limited, however, $CO_2$ laser, argon laser, YAG laser, excimer laser, fiber laser, quartz laser and the like are included. The adhesive layer 75 can be removed with the laser at a scan speed of 50 to 11000 m/sec, a wavelength of 10 to 100000 nm, and a frequency of 1 to 200 kHz.

In case of YAG laser, when treatment is executed under the condition at a scan speed of 50 to 3000 m/sec, a wavelength of 1064 nm, and a frequency of 1 to 200 kHz, only the adhesive layer 75 applied on the surface of the slinger 7 can be removed. Further, under the condition at a scan speed of 200 m/sec, a wavelength of 1064 nm, and a frequency of 5 kHz, the adhesive layer 75 can be more preferably removed.

When any values mentioned above are not satisfied in the laser treatment, the adhesive layer 75 cannot be completely removed. When any values exceed the above mentioned conditions, the slinger 7 is melt. According to several trials by the inventors of the present invention, it is found that the adhesive layer 75 tends to remain when the scan speed is low.

Under such laser treatment, accurate and effective treatment can be executed at the slidably contacting surface 73 of the slinger 7 of which treating face is alike a ring and the area is small. Further, the degree of treatment can be easily controlled depending on the characteristic of the material of the slinger 7 and the thickness of the adhesive layer 75 by the laser treatment.

In case of YAG laser, when treatment is executed under the condition at a scan speed of 50 to 2000 m/sec, a wavelength of 1064 nm, and a frequency of 20 to 200 kHz, surface roughening process can be executed in addition to removal of the adhesive layer 75. Further, under the condition at a scan speed of 500 m/sec, a wavelength of 1064 nm, and a frequency of 20 kHz, the adhesive layer 75 can be more preferably removed.

Accordingly, the adhesive layer 75 can be removed from the slidably contacting surface 73 and surface roughening treatment of the slidably contacting surface 73 can be executed by one process, thereby facilitating the production procedure.

(Shot Peening Treatment)

The following conditions are employed for a shot peening treatment for removing the adhesive layer 75.

According to a shot peening treatment, the adhesive layer 75 is removed or the slidably contacting surface 73 can be executed with roughening treatment in addition to removal of the adhesive layer 75 by shooting and hitting minute solid particles thereon. A steel ball having a diameter of 20 to 200 μm is used as the minute solid particle and is shot to be hit on the slidably contacting surface 73 at a shooting speed of 50 to 200 m/sec. Minute solid particles made of metal, glass or ceramic may be used.

When any values mentioned above are not satisfied in the shot peening treatment, the adhesive layer 75 cannot be completely removed. When any values exceed the above mentioned conditions, the surface of the slinger 7 is too roughened and its strength is adversely affected.

According to the shot peening treatment, the roughened surface becomes an uneven surface without edges like a laser treatment, so that the friction resistance of the slidably contacting surface 73 can be effectively reduced. Further, under the above-mentioned condition, the adhesive layer 75 can be removed and the slidably contacting surface 73 can be executed with surface roughening treatment by one process, thereby facilitating the production procedure.

Figure 3A:
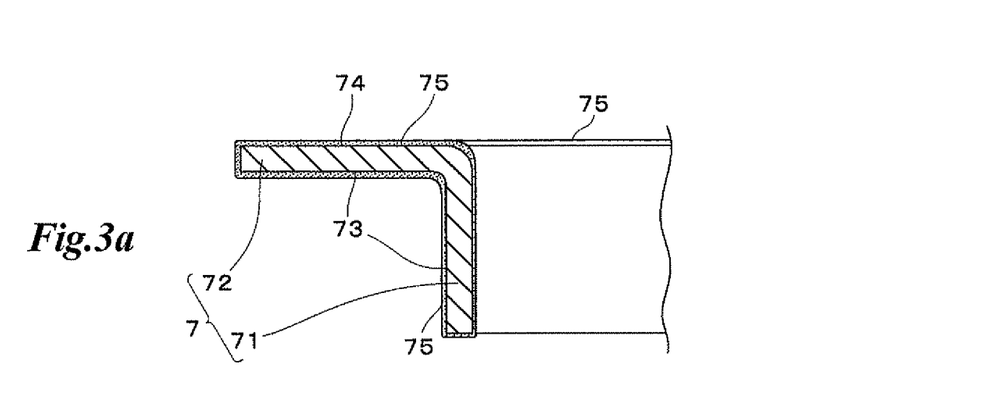
Figure 3B:
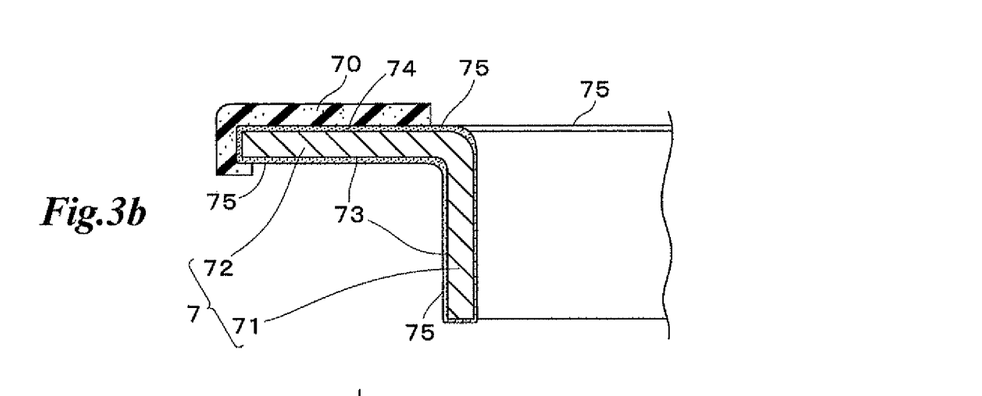
Figure 3C:
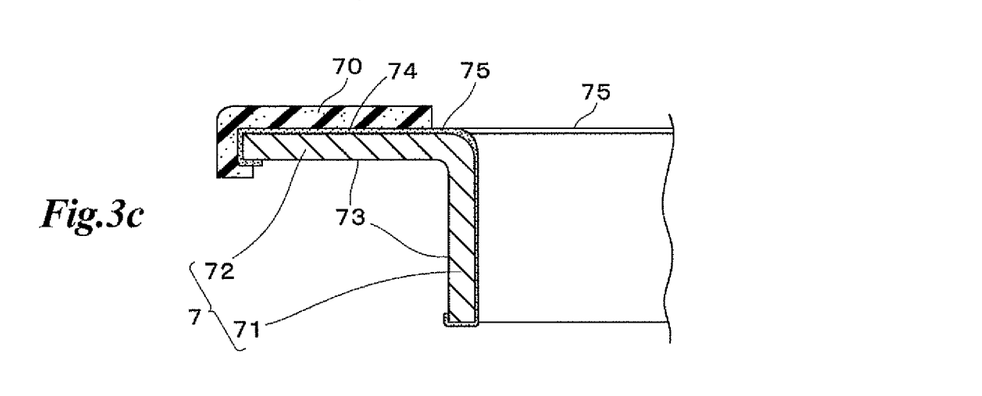

Referring to FIG. 3, one example of the production procedure of the sealing device 6 with tone wheel according to the first embodiment is explained. Here, the production procedure of the slinger 7 with tone wheel 70 is specifically explained.

As shown in FIG. 3a, the ring-like slinger 7 obtained by sheet metal processing of stainless steel (SUS430 and the like) is formed. The fitting cylindrical portion 71 of the slinger 7 is formed so as to be fitted into the peripheral body of the inner ring (hub 3 and the inner ring member 33), and the brim portion 72 is formed so as to be radially extended at the end of the fitting cylindrical portion 71, which is outside relative to the sealed portion S.

For applying an adhesive agent on the whole surface of thus formed slinger 7, the slinger 7 is dipped in the adhesive agent prepared in a vessel. When the whole surface of the slinger 7 is applied with the adhesive agent, it is taken out of the vessel. FIG. 3a shows the slinger 7 on which whole surface the adhesive layer 75 is formed.

The slinger 7 of which whole surface is formed with the adhesive layer 75 is placed at a fixed position in a mold (not shown) to mold the tone wheel 70. Then, unvulcanized rubber or resin material is charged from an inlet to the mold and an annular molded body is integrally formed with the slinger 7. When the mold is heated to harden the annular molded body and the adhesive layer is also heated and hardened, a plurality of S poles and N poles are alternately provided along the circumferential direction to magnetize the annular molded body. Then, the tone wheel 70 firmly and integrally stuck to the slinger 7 can be taken out of the mold (see FIG. 3b).

Thus obtained tone wheel 70 is shaped like a claw so as to cover the end of the brim portion 72 of the slinger 7 as shown in the figure, so that the adhesive agent can be spread on the whole sticking surface of the tone wheel 70 even if the sticking surface includes a small portion, thereby allowing the tone wheel 70 to firmly adhere to the slinger 7.

The adhering method of the tone wheel 70 and the slinger 7 is not limited to the cure adhesion as mentioned above. The forming method of the adhesive layer 75 is not limited to the example mentioned above, and the adhesive agent may be applied on the whole surface of the slinger 7 with a brush.

After the outer surface 74 of the slinger 7 is attached with the tone wheel 70, the adhesive layer 75 formed on the slidably contacting surface 73 of the slinger 7 with the seal lip (82) is removed (see FIG. 3c). The removal method of the adhesive layer 75 is not specifically limited, however the adhesive layer 75 may be scraped off by the above-mentioned laser treatment or it may be wiped off with an adhesive removing liquid which is to be used depending on the component of the adhesive agent forming the adhesive layer 75.

As mentioned above, the adhesive layer 75 can be removed and in addition the surface roughening treatment as shown in the enlarged view of "Y" portion in FIG. 2 can be executed by a laser treatment, thereby facilitating the treatment procedure and being preferable.

Accordingly, the slinger 7 integrally stuck with the tone wheel 70 can be produced, and the sealing device 6 with the tone wheel 70 is constituted by combining thus produced slinger 7 and the core material 80 fixed with the elastic sealing member 8 (see FIG. 2).

The surface roughening treatment mentioned above is not always necessary and the torque can be reduced comparing with the slidably contacting surface 73 formed with the adhesive layer 75 only by removing the adhesive layer 75.

Figure 4A:
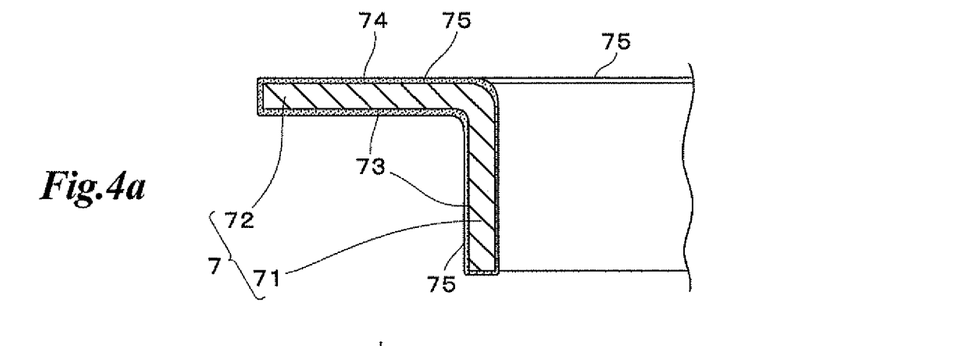
Figure 4B:
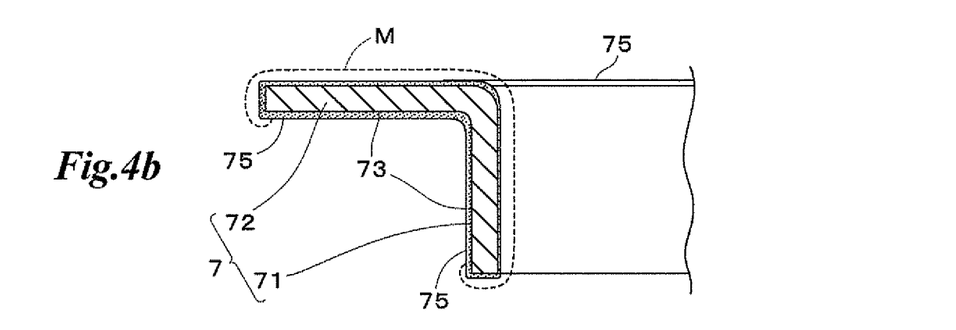
Figure 4C:
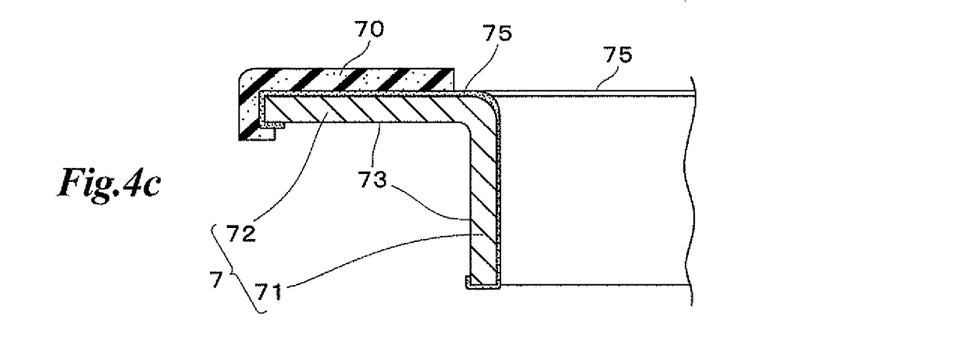

Other example different from the production procedure of FIG. 3 is explained referring to FIG. 4. The common members to the above-mentioned example is allotted with the same reference numbers and their explanations are omitted here.

As shown in FIG. 4a, the ring-like slinger 7 obtained by sheet metal processing of stainless steel (SUS430 and the like) is formed. The slinger 7 has the fitting cylindrical portion 71 and the brim portion 72 like FIG. 3.

For applying an adhesive agent on the whole surface of the slinger 7, the slinger 7 is dipped in the adhesive agent prepared in a vessel. When the whole surface of the slinger 7 is applied with the adhesive agent, it is taken out of the vessel. FIG. 4a shows the slinger 7 on which whole surface the adhesive layer 75 is formed.

The surface of the slinger 7 formed with the adhesive layer 75 other than the slidably contacting surface 73 is covered with a jig as shown with a dotted line in FIG. 4b. Then the adhesive layer 75 formed on the exposed slidably contacting surface 73 is removed. The removal method is mentioned above.

After the removal treatment of the adhesive layer 75, the slinger 7 is placed at a fixed position in a mold (not shown) to mold the tone wheel 70. Then, the tone wheel 70 is formed and magnetized as mentioned above.

Then, the tone wheel 70 firmly and integrally stuck to the slinger 7 can be taken out of the mold (see FIG. 4c). Accordingly, the sealing device 6 with the tone wheel 70 is obtained by combining thus produced slinger 7 and the core material 80 fixed with the elastic sealing member 8 (see FIG. 2).

Thus obtained tone wheel 70 is shaped like a claw so as to cover the end of the brim portion 72 of the slinger 7 as shown in the figure like the production method in FIG. 3, so that the adhesive agent can be spread on the whole sticking surface of the tone wheel 70 even if the sticking surface includes a small portion, thereby allowing the tone wheel 70 to firmly adhere to the slinger 7.

The removal method of the adhesive layer 75 mentioned above is to cover the surface other than the slidably contacting surface 73 (the sticking surface of the tone wheel 70 in the above example) with a jig to expose the slidably contacting surface 73, however this invention is not limited to such a method. For example, the surface other than the objective slidably contacting surface 73 may be covered with a special masking member or when the surface other than the slidably contacting surface 73 is partially exposed, only the exposed surface may be covered with a masking member.

Figure 5:
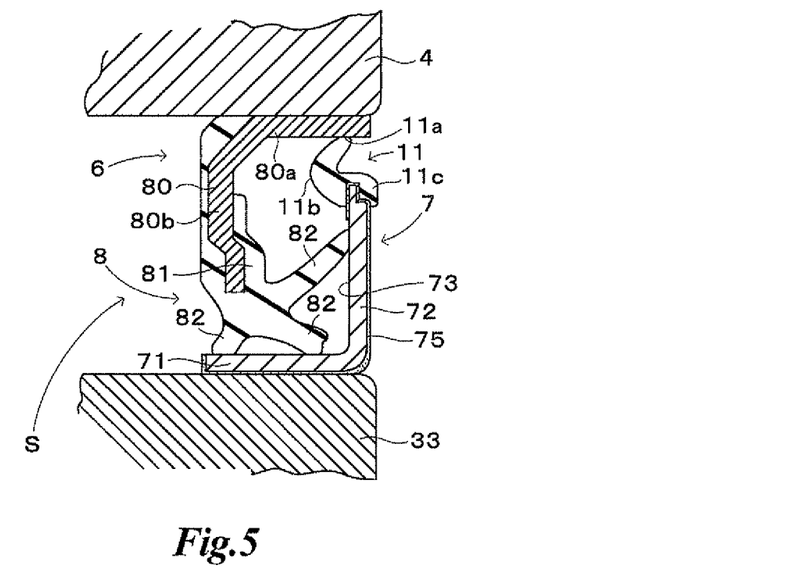
FIG. 5 shows a modified embodiment of the sealing device of the first embodiment and is a similar view to FIG. 2.

FIG. 5 shows a modified embodiment of the sealing device of the first embodiment wherein a rotary side seal lip 11 is provided for the slinger 7 as a fixing member.

The common members as the above-mentioned embodiment have the same reference numbers and their explanations are omitted.

The rotary side seal lip 11 is made of a rubber material selected from NBR, H-NBR, ACM, AEM, FKM like the sealing member 8. The rotary side lip 11 comprises a tip portion 11a which slidably contacts the cylindrical portion 80a of the core member 80, a crooked portion 11b bent into the sealed portion S, and a base portion 11c which is integrally fixed to the end of the brim portion 72 of the slinger 7 so as to cover along its edge.

The adhesive layer 75 is once formed on the whole surface of the slinger 7 and the adhesive agent can be spread on the whole sticking surface of the rotary side seal lip 11 with small attaching sticking area, so that the rotary side seal lip 11 can be firmly adhered to the slinger 7 in the embodiment of FIG. 5. The tip portion 11a of the rotary side seal lip 11 fixed to the slinger 7 elastically and slidably contacts with the core member 80, so that the sealing ability of the bearing unit 1 can be kept by the elastic slidable contact of both seal lips. Specifically, by providing the rotary side seal lip 11, the centrifugal force is exerted accompanied with rotation of the inner ring (3, 33) and dust and dirt are effectively prevented from entering into the bearing unit 1, thereby responding a severe sealing required performance.

The adhesive layer 75 is removed from the slidably contacting surface 73 to which the seal lip 82 of the sealing member 8 slidably contacts by the above-mentioned method also in the embodiment of FIG. 5, so that the friction resistance of the seal lip 82 can be reduced, thereby achieving remarkable reduction of the rotary torque.

Figure 6:
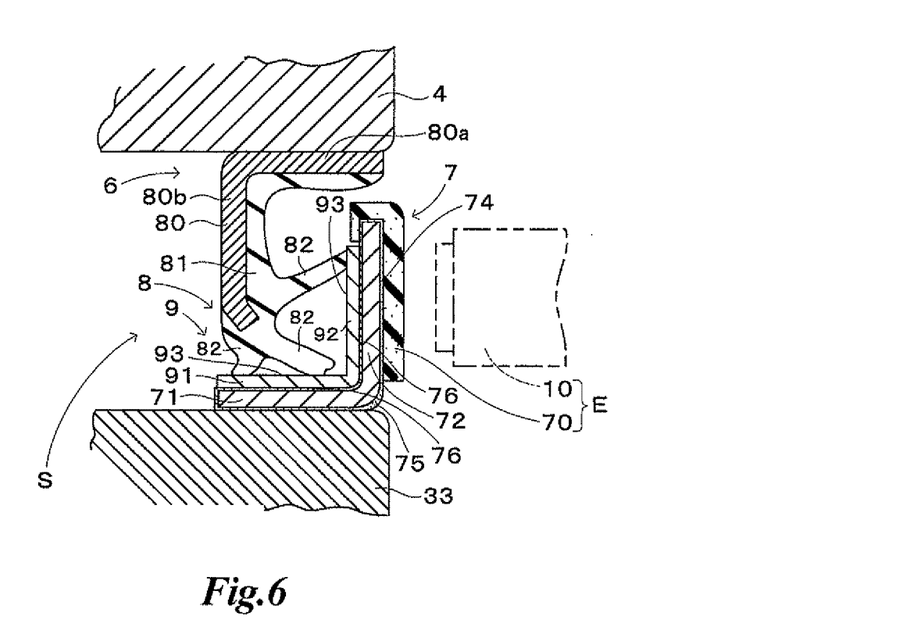
FIG. 6 shows the second embodiment of the sealing device of the present invention and corresponds to the enlarged view of "X" in FIG. 1.
Figure 7A:
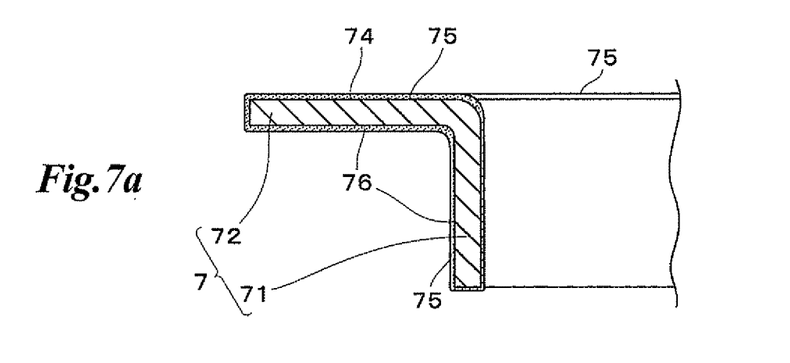
FIG. 7 is a diagrammatical sectional view showing the production procedure of the second embodiment.
Figure 7B:
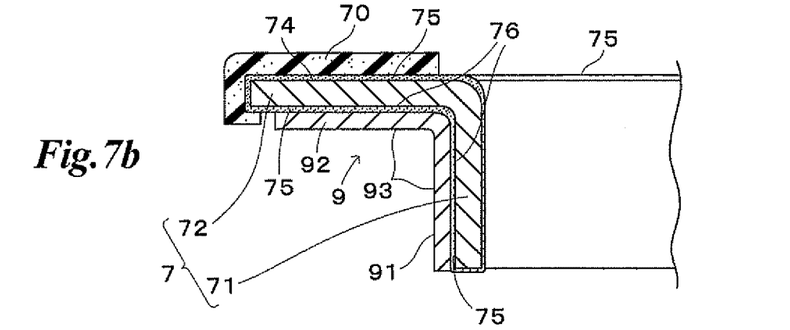
Figure 8:
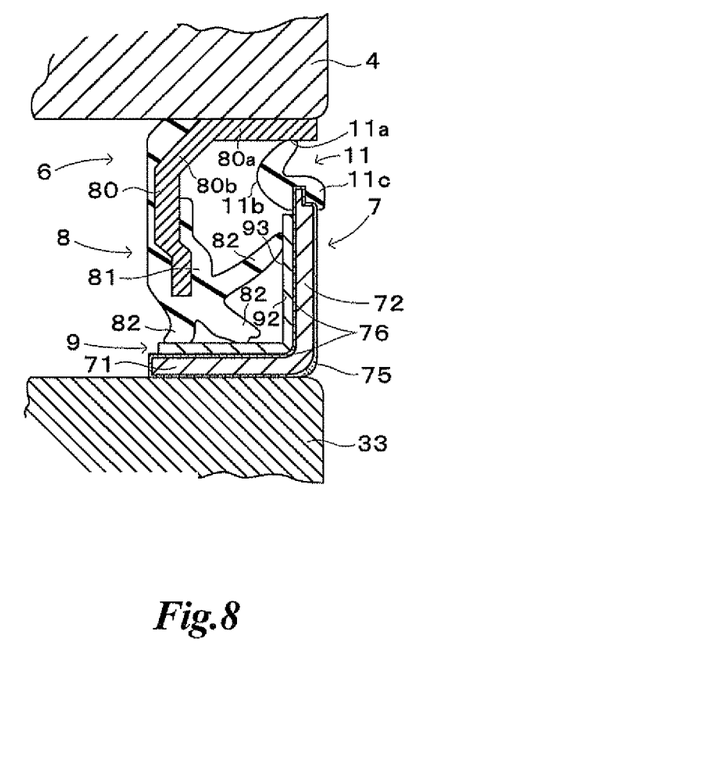
FIG. 8 shows a modified embodiment of the sealing device of the second embodiment and is a similar view to FIG. 2.

The second embodiment of the present invention is explained referring to FIG. 6 to FIG. 8.

The common members to the above-mentioned first embodiment are allotted with the same reference numerals and their explanations are omitted.

The second embodiment is different from the first embodiment in that other member 9 is interposed on the upper surface of the slidably contacting surface 73 of the slinger 7 with the seal lip 82 and a slidably contacting surface 93 is constituted. The other member 9 provided at the slidably contacting surface 73 side of the slinger 7 and they are integrally stuck via the adhesive layer 75. The portion to which the sealing device 6 with the tone wheel 70 is attached and structures of the slinger 7, the core member 80 and the sealing member 8 are the same as those in the first embodiment.

The production procedure of the sealing device 6 with the tone wheel 70 according to the second embodiment is explained referring to FIG. 7. Here, the production procedure of the slinger 7 with the tone wheel 70 is specifically explained.

The forming method of the slinger 7 and the method of forming the adhesive layer on the whole surface of the slinger 7 and integrally sticking the tone wheel 70 are the same as those in the first embodiment, so their explanations are omitted.

FIG. 7a shows that the adhesive layer 75 is formed on the whole surface of the slinger 7. After the tone wheel 70 is integrally stuck to a position which becomes the outer surface 74 of the tone wheel 70 under such condition, the other member 9 is provided at the surface 76 of the slinger 7 to which the seal lip (82) slidably contacts (see FIG. 7b). The other member 9 may be provided after the tone wheel 70 is stuck or after the other member 9 is provided, the tone wheel 70 may be integrally stuck.

The other member 9 provided on the upper surface of the of the slidably contacting surface 73 comprises a cylindrical portion 91 formed so as to be overlapped with the fitting cylindrical portion 71 of the slinger 7 and a brim portion 92 formed so as to be overlapped with the brim portion 72 of the slinger 7. The other member 9 is formed by sheet metal processing of stainless steel like SUS430 or engineering plastic, ceramics, glass, industrial diamond, a resin material with low friction, elastomer and so on like the slinger 7. Because the other member 9 is fitted to the surface of the slinger 7 to which the seal lip (82) slidably contacts via the adhesive layer 75, it is integrally fitted to the slinger 7 firmly. Of course, the slinger 7 and the other member 9 may be integrally adhered with the adhesive layer 75.

The shape of the tone wheel 70 shown in the figure is the same as that in the first embodiment.

Thus, the slinger 7 integrally stuck with the tone wheel 70 can be produced, and the sealing device 6 with the tone wheel 70 is constituted by combining thus produced slinger 7 and the core member 80 fixed with the elastic sealing member 8 (see FIG. 6).

Accordingly, the adhesive layer 75 id not formed on the slidably contacting surface 93 with the seal lip 82 because the other member 9 is interposed, so that the friction resistance of the seal lip 82 can be reduced and reduction of the rotary torque can be achieved.

Also in this case, the whole sticking surface of the tone wheel 70 is filled with the adhesive agent applied on the whole surface of the slinger 7, so that an adhesive agent spreads into every end of the tone wheel 70 and the tone wheel 70 can be firmly adhered to the slinger 7.

Further according to the second embodiment, when the slidably contacting surface 93 of the other member 9 is treated to be roughened, the friction resistance of the seal lip 82 can be more reduced and remarkable reduction of the rotary torque can be achieved. The treatment method of surface roughening may be the same as that in the first embodiment, and it may be executed before integrally fitting to the slinger 7 or it may be executed after integral fitting.

FIG. 8 shows an modified embodiment of the sealing device of the second embodiment. Here explained is a sample in which the rotary side seal lip 11 is provided for the slinger 7 as the fixing member.

The common members to the above-mentioned embodiment have the same reference numbers and their explanations are omitted.

The rotary side seal lip 11 is the same as that in the example in FIG. 5 and is formed so as to slidably contact the cylindrical portion 80a of the core member 80 and is integrally fixed to the end of the brim portion 72 of the slinger 7 so as to cover along its edge.

In this case, the adhesive layer 75 is not formed on the slidably contacting surface 93 of the seal lip 82 because the other member 9 is interposed, so that the friction resistance of the seal lip 82 can be reduced and reduction of the rotary torque can be achieved. The whole surface of the slinger 7 is formed with the adhesive layer 75 and the adhesive agent can be spread on the whole sticking surface of the rotary side seal lip 11 with small sticking area, thereby allowing the rotary side seal lip 11 to firmly adhere to the slinger 7.

It goes without saying that the present invention is not limitedly applied to the bearing unit 1 in the figure, however, it can be applied to the bearing mechanism in which the inner ring is fixed or the outer ring is fixed. The structure of the sealing device 6, the shape of the tone wheel 70, the sealing member 8 and the rotary side seal lip 11 are not limited to those shown in the figure.

The invention claimed is:

1. A production method for a sealing device having a slinger fixedly fitted into a rotary side member, a core member fixedly fitted into a stationary side member, and an elastic sealing member fixed to the core member and having a seal lip which elastically and slidably contacts the slinger, said sealing device sealing a space between said rotary side member and said stationary side member, in which said slinger has a slidably contacting surface for said seal lip, a fitting cylindrical portion to be fitted into said rotary side member and a brim portion extending in the radial direction of said slinger from an end of an outer side relative to a part of said fitting cylindrical portion to be sealed, and a rotary side fixing member is integrally attached to an outer surface of said brim portion of said slinger relative to the sealed portion wherein the production method comprises the steps of:

in the process of attaching said rotary side fixing member to said slinger forming an adhesive layer on the whole surface of said slinger by applying an adhesive agent; then integrally attaching said rotary side fixing member to the outer surface of said brim portion of said slinger relative to the sealed portion; and thereafter executing a removal of the adhesive layer which has been formed corresponding to said slidably contacting surface of said slinger which said seal lip slidably contacts and a surface roughening treatment on said slidably contacting surface to reduce the friction resistance of said seal lip by one process.

2. The production method for a sealing device as set forth in claim 1, wherein said adhesive layer is partially removed only in said contacting surface by way of laser emission treatment.

3. A production method for a sealing device having a slinger fixedly fitted into a rotary side member, a core member fixedly fitted into a stationary side member, and an elastic sealing member fixed to the core member and having a seal lip which elastically and slidably contacts the slinger, said sealing device sealing a space between said rotary side member and said stationary side member, in which said slinger has a slidably contacting surface for said seal lip, a fitting cylindrical portion to be fitted into said rotary side member and a brim portion extending in the radial direction of said slinger from an end of an outer side relative to a part of said fitting cylindrical portion to be sealed, and a rotary side fixing member is integrally attached to the outer surface of said brim portion of said slinger relative to the sealed portion, wherein the production method comprises the steps of:

in the process of attaching said rotary side fixing member to said slinger, forming an adhesive layer on the whole surface of said slinger by applying an adhesive agent; then executing a removal of the adhesive layer which has been formed corresponding to said slidably contacting surface of said slinger which said seal lip slidably contacts and a surface roughening treatment on said slidably contacting surface to reduce the friction resistance of said seal lip by one process; and thereafter integrally attaching said rotary side fixing member to an outer surface of said brim portion of said slinger relative to the sealed portion.

4. The production method for a sealing device as set forth in claim 3, wherein said adhesive layer is partially removed only in said slidably contacting surface by way of laser emission treatment.

5. A production method for a sealing device having a slinger fixedly fitted into a rotary side member, a core member fixedly fitted into a stationary side member, and an elastic sealing member fixed to the core member and having a seal lip which elastically and slidably contacts the slinger, said sealing device sealing a space between said rotary side member and said stationary side member, in which said slinger has a slidably contacting surface for said seal lip, a fitting cylindrical portion to be fitted into said rotary side member and a brim portion extending in the radial direction of said slinger from an end of an outer side relative to a part of said fitting cylindrical portion to be sealed, and a rotary side fixing member is integrally attached to an outer surface of said brim portion of said slinger relative to the sealed portion, wherein the production method comprises the steps of:

in the process of attaching said rotary side fixing member to said slinger, forming an adhesive layer on the whole surface of said slinger by applying an adhesive agent; then attaching said rotary side fixing member to the outer surface of said brim portion of said slinger relative to the sealed portion; and thereafter attaching another member to the portion corresponding to said slidably contacting surface of said slinger which said seal lip slidably contacts; and thereafter a surface roughening finishing is treated on said another member to reduce the friction resistance of said seal lip.

\* \* \* \* \*